US005126762A

United States Patent [19]

Takeuchi et al.

[11] Patent Number: 5,126,762

[45] Date of Patent: Jun. 30, 1992

[54] RECORDING SHEET USED WITH IMAGE RECORDING APPARATUS, AND METHOD AND APPARATUS FOR FORMING IMAGE

[75] Inventors: Tatsuo Takeuchi, Kawasaki; Koji Amemiya, Tokyo, both of Japan

[73] Assignee: Canon Kabushiki Kaisha, Tokyo, Japan

[21] Appl. No.: 539,895

[22] Filed: Jun. 18, 1990

[30] Foreign Application Priority Data

Jun. 16, 1989 [JP] Japan ................................ 1-154166
Dec. 11, 1989 [JP] Japan ................................ 1-322311

[51] Int. Cl.⁵ ............................................ G01D 9/00
[52] U.S. Cl. .................................................. 346/135.1
[58] Field of Search ............................ 346/134, 135.1

[56] References Cited

U.S. PATENT DOCUMENTS

| | | | |
|---|---|---|---|
| 4,637,974 | 1/1987 | Kubit | 430/126 |
| 5,019,841 | 5/1991 | Fulton et al. | 346/134 |

FOREIGN PATENT DOCUMENTS

| | | | |
|---|---|---|---|
| 0114471 | 8/1984 | European Pat. Off. | 346/134 |
| 58-90647 | 5/1983 | Japan . | |
| 58-105157 | 6/1983 | Japan . | |
| 58-106550 | 6/1983 | Japan . | |
| 58-150363 | 9/1983 | Japan | 346/134 |
| 59-7367 | 1/1984 | Japan . | |
| 60-008089 | 1/1985 | Japan | 346/134 |

OTHER PUBLICATIONS

Patent Abstracts, Japan, vol. 7, No. 270 (P-240) (1415) Dec. 2, 1983.

Xerox Disclosure Journal, vol. 12, No. 1, Jan./Feb. 1987, "A 'No-Stripe' Optical Paper Path Sensor For Transparencies and Paper", by J. R. Andrews.

*Primary Examiner*—George H. Miller, Jr.
*Attorney, Agent, or Firm*—Fitzpatrick, Cella, Harper & Scinto

[57] ABSTRACT

The present invention provides a recording sheet used with an image forming apparatus comprising: an optical functional portion disposed along at least one edge of the recording sheet and arranged asymmetrically with respect to a center of the edge and having a functional feature regarding light different from that of an image forming portion of the recording sheet.

8 Claims, 5 Drawing Sheets

RECORDING SHEET USED WITH IMAGE RECORDING APPARATUS, AND METHOD AND APPARATUS FOR FORMING IMAGE

BACKGROUND OF THE INVENTION

1. Field of the Invention

The present invention relates to a recording sheet on which a toner image is formed by electronic photography or electrostatic recording method.

The present invention further relates to an image forming apparatus such as an electronic photographic system, electrostatic recording system or the like, and more particularly, it relates to a method and an apparatus for forming an image, which has a detecting means for detecting a recording sheet on which a toner image is formed.

2. Related Background Art

In the past, the technique in which a monocolor toner image is formed on a recording sheet comprising a transparent film made of polyester by means of an electronic photographic system and the toner image is used in an OHP (overhead projector) as a projecting image has been practically utilized.

Recently, in such electronic photographic system, in order to detect a moving condition of the recording sheet in the system, a permeable-type optical sensor wherein the presence of the recording sheet is detected by interrupting a light beam from a light source such as an LED (by the recording sheet) to change an output signal from a photoelectric converting element such as a CCD, photo-coupler or the like, or a reflection-type optical sensor wherein the presence of the recording sheet is detected by changing an output signal from a photoelectric converting element whether a light beam from a light source is reflected by the recording sheet or not has been used, thereby reducing the cost of the system and ensuring the detection accuracy and/or stable movement of the recording sheet in the system.

If the transparent film such as a polyester film or the like is used as the recording sheet, since the light source such as the LED has a luminous wave length from visual light to infrared light, it is difficult to absorb or reflect the light from the LED, which results in the failure in the detection of the recording sheet. To avoid this, the technique in which an opaque portion for absorbing or reflecting the light from the LED is provided on a part of the transparent film has been proposed, as disclosed in the Japanese Patent Laid-Open Nos. 58-90647, 58-105157 and 59-7367.

Such opaque portion is obtained by painting on the transparent sheet the paint capable of cutting the light from the LED by 60% or more, or by adhering a paper or cloth strip on the transparent sheet, or by deposing on the transparent sheet a metal capable of shielding the infrared luminous LED, thereby permitting the detection of the sheet. As shown in FIGS. 2A to 2D, such opaque portion is formed on the transparent rectangular sheet along its one, two, three or four edges thereof with a constant width, as illustrated by a hatched area. Further, as disclosed in the Japanese Patent Laid-Open No. 58-106550, a plurality of opaque portions are formed on the transparent sheet as illustrated by hatched areas in FIGS. 2E to 2H, whereby, if the sheet is jammed in the system, the jammed portion of the sheet can be easily determined or ascertained.

On the other hand, in order to improve the adhesion feature of the toner to be fixed and/or to improve the permeability and color reappearance feature of the colored image, as a recording sheet such as a transparent sheet or the like used with a recording apparatus of the electronic photographic system, the Applicant has proposed a transparent sheet including front and back surfaces having different functional features by coating a transparent resin material (on which a color toner image is formed) on a transparent film.

In case of such recording sheet, it is necessary to determine the front surface and back surface of the recording sheet. However, the conventional recording sheet has no means for determining the front and back surfaces thereof, detected by the recording apparatus.

Further, in the conventional image forming apparatuses, if the recording sheet including the front and back surfaces having the different functional features is used to form the image thereon, when an operator handles the recording sheet with erroneous judgement of the front and back surfaces thereof, the image is formed on the surface on which the resin material is not coated, thus resulting in the poor image formation.

In order to eliminate such drawback, although it can be considered that the both surfaces of the film (recording sheet) are coated by the resin material, there will arise a problem that the recording sheet as consumption goods becomes expensive and the primary function of the recording sheet cannot be carried out.

SUMMARY OF THE INVENTION

An object of the present invention is to provide a recording sheet having a mark for permitting the determination of front and back surfaces of the sheet.

Another object of the present invention is to provide an image forming method which can properly form an image on a recording sheet, by detecting the recording sheet to be fed.

A further object of the present invention is to provide an image forming apparatus which can positively form an image on a treated surface of a recording sheet having the treated surface at its only one side.

Other object of the present invention will be apparent from the following description.

DESCRIPTION OF THE PREFERRED EMBODIMENTS

The present invention will now be explained in connection with embodiments thereof with reference to the accompanying drawings.

Figure 1C:
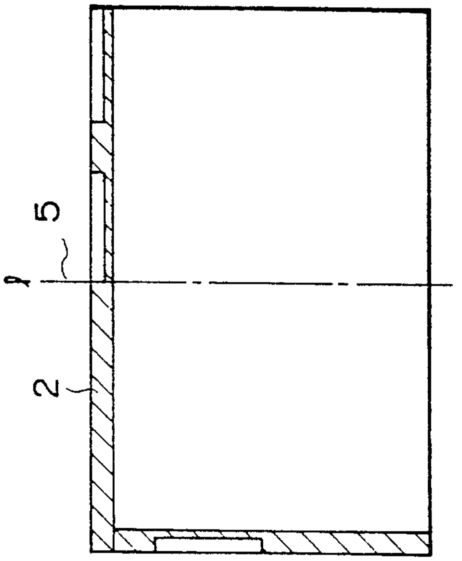
FIGS. 1A to 1C are plan views of recording sheets according to the present invention.
Figure 1D:
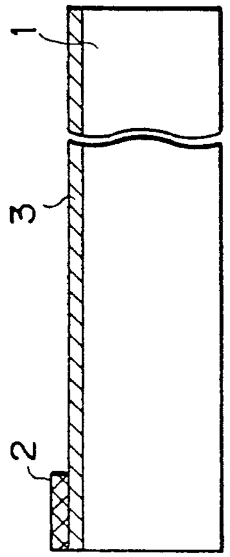
FIG. 1D is a sectional view of the recording sheet.
Figure 1A:
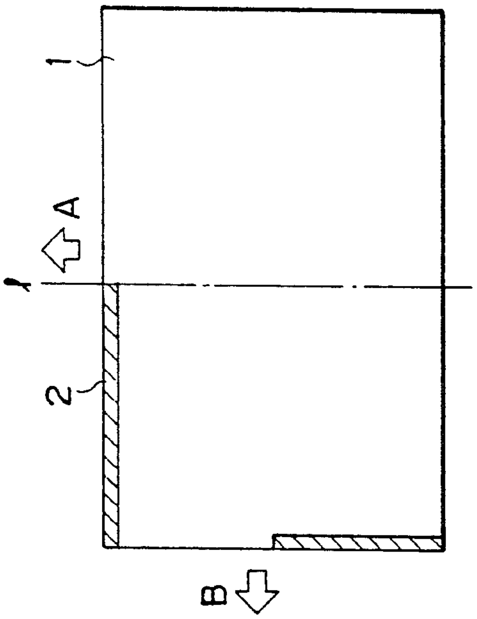

FIG. 1A is a plan view of a recording sheet according to a preferred embodiment of the present invention, and FIG. 1D is a sectional view of the recording sheet.

In these FIGURES, the reference numeral 1 denotes a transparent film; 2 denotes opaque portions; and 3 denotes a functional surface portion comprising transparent material improving the quality of an image.

The transparent film 1 comprises a heat-resistive resin film. for example, made of polyester, polyamide, polyimide or the like, which can endure to the maximum service temperature of 100° C. Particularly, in view of heat-resistance and transparency, polyethylene terephthalate (PET) material is preferable. Regarding a thickness of the film, it is necessary to have a thickness of 50 μm or more to prevent the film from shrinking under a fixing heat, and it is preferable to have a thickness of 200 μm or less to ensure the good transparency of the film.

Figure 1B:
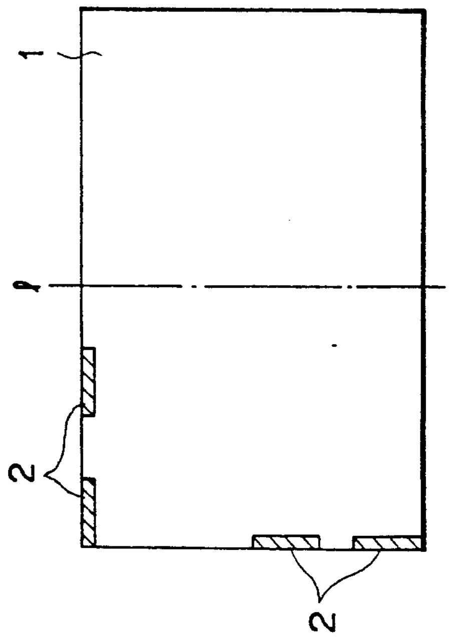
Figure 2A:
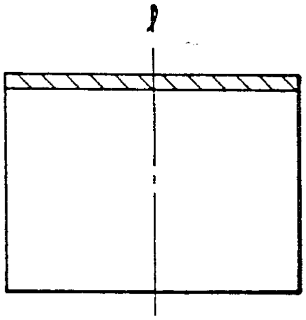
FIGS. 2A to 2H are plan views of conventional recording sheets.
Figure 2B:
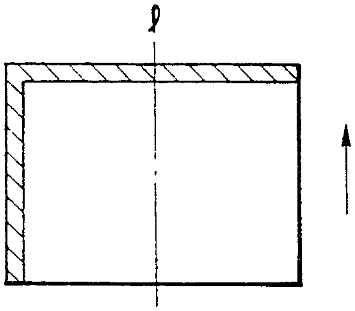
Figure 2C:
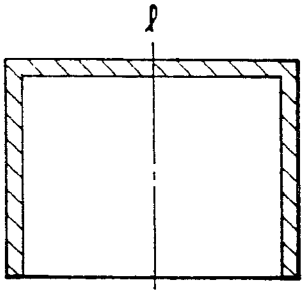
Figure 2D:
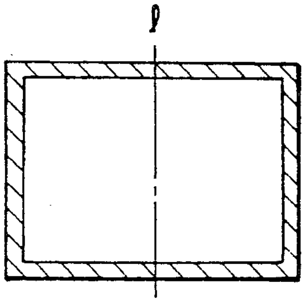
Figure 2E:
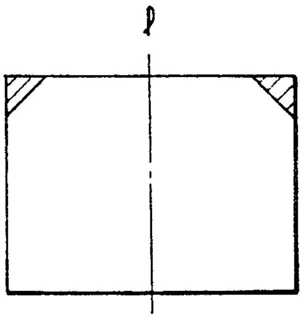
Figure 2F:
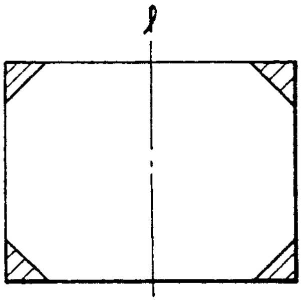
Figure 2G:
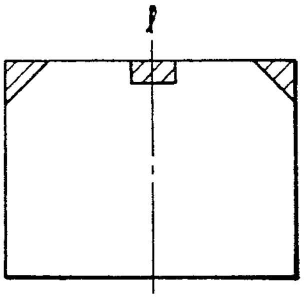
Figure 2H:
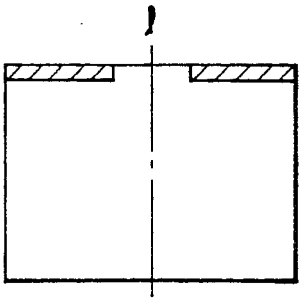

As shown in FIGS. 1A to 1C, the opaque portions 2 are constituted by printing opaque material on the film or by adhering a paper or cloth on the film to absorb or reflect a wave length of light from a light source used with an optical sensor by 60% or more, and the optical function of opaque portions 2 have a different optical function (regarding the light) from that of the image forming portion. As shown, the opaque 2 may be disposed continuously or intermittently along one edge of the film and may be arranged asymmetrically with respect to a center of the one edge along which the opaque portions are disposed. Further, the opaque portions may be positioned to align with a position of an optical sensor (combination of a light source and a photo-transistor) in the apparatus. Incidentally, the position of the optical sensor will be described later with respect to an electronic photographic system. The functional surface portion 3 comprises a coated film layer for affording the operability to the transparent film, and, in the illustrated example, is disposed on the same surface of the transparent film as the surface on which the opaque portions 2 are disposed. However, the functional surface portion 3 may be disposed on the opposite surface. Further, functional surface portions having different operational features may be provided on both surfaces of the transparent film.

The operability afforded to the transparent film are, for example, as follows:

(1) Control for a surface resistance value of the transparent film;
(2) Control for a surface friction force of the transparent film;
(3) Application of fixedness of toner to the transparent film; and
(4) Improvement of color reappearance of a color toner image formed on the transparent film, when the light is passed through the toner image. Further, physical and/or chemical functions other than the above may be afforded to the transparent film, so long as these functions are different on both surfaces of the film.

Next, the embodiments of the present invention will be fully explained.

A solution obtained by dissolving polyester resin A (having solubility parameter of about 11.0) having melt viscosity of $20\times10^4$ poise at a temperature of 130° C. into acetone was painted on one surface of a PET film having a continuous service temperature of 150° C. by means of the bar corter method to form a coating layer having a thickness of 16 μm after drying, thus obtaining a laminated transparent film. With this laminated construction, the color reappearance when the light passes through the color toner image is improved.

Further, as shown by a hatched area in FIG. 1A, ultraviolet radiation cured black acrylic resin (cured by the ultraviolet radiation) capable of blocking infrared light having a wave length of 800~1,000 nm by 80% or more was painted on an opposite surface (regarding the coating layer) of the film along two edges thereof, thus obtaining a desired film. The size of the film was A4 (Japanese Industrial Standard).

Figure 3A:
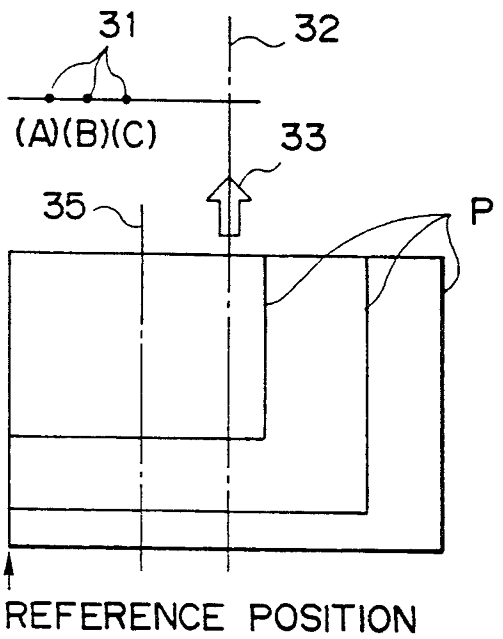
FIGS. 3A to 3C are views showing a positional relationship between an optical sensor and a recording sheet.

The obtained film was fed into an electronic photographic system having a sheet feeding path wherein a transfer sheet 34 is positioned with respect to a center line 32 on the basis of one side reference position and wherein an optical sensor 31 for detecting the transfer sheet is disposed at one side of a center line 35 of the small-sized transfer sheet, with the coincidence of the arrow A shown in FIG. 1A with the arrow 33 shown in FIG. 3A.

Incidentally, the toner image was formed on the coating layer. The toner used was yellow toner having a good relative melting feature to the coating layer at a melting condition during the fixing operation.

When the transparent film was fed in accordance with the illustrated embodiment, a sharp yellow image was obtained after the image formed on the transparent film was projected through an OHP (overhead projector) without trouble.

To the contrary, when the film was fed in a condition that the film was reversed in the left and right direction with respect to the arrow A and was overturned with respect to the front and back surfaces, the opaque portions 2 were not encountered with any of the sensors 31. and at least one of the sensors could determine the front and back surface of the film, thus automatically stopping the apparatus before the formation of the image and preventing the formation of the image without using the functional features afforded to the transparent film.

Incidentally, the opaque portions 2 are preferable to cut or reflect the light from the light source by 60% or more.

To the contrary, when the transparent film having the opaque portions as shown in FIGS. 2A to 2D illustrating the conventional example was used, the failure of the feeding of the film coult not prevented from occurring.

FIGS. 1B and 1C show other embodiments of transparent film as recording sheets, where the configurations of the opaque portions are different from those shown in FIG. 1A.

As shown in FIG. 1B, the opaque portions are provided in two areas as illustrated by the hatched areas, and the sensors in the electronic photographic system are positioned in correspondence to these opaque portions. In the recording sheet as shown in FIG. 1C, the opaque portion is continuously formed, but the left and right portions of the opaque portion with respect to a center line 5 are asymmetrical with respect to the center line 5. In this case, the sensors are arranged in correspondence to the opaque portions having a wider width.

Figure 3B:
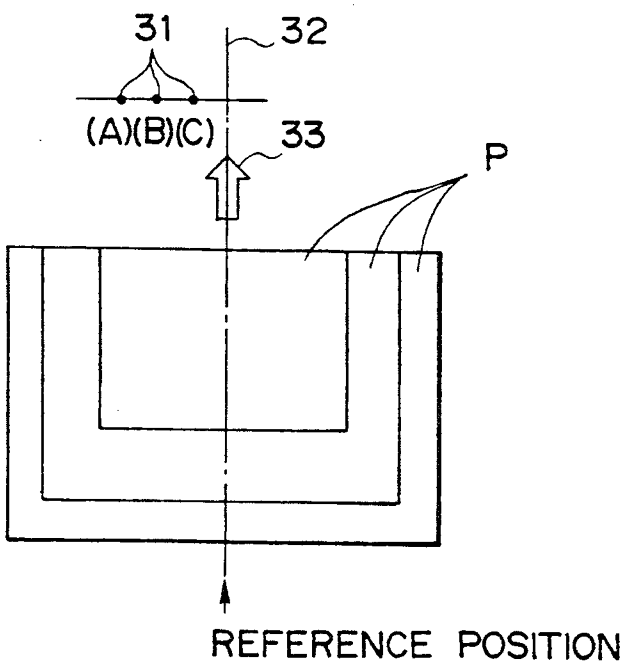

Further, in the above-mentioned illustrated embodiment, while the transfer sheet was fed in the sheet feeding path having the reference position disposed at one side of the film, as shown in FIG. 3B, a central reference position may be used without any trouble.

Further, in FIGS. 1A to 1C, the opaque portions 2 are provided along two edges perpendicular to each other (of the film).

With this arrangement, even if the feeding direction of the transparent film is either the direction A or a direction B, the front and back surfaces of the sheet can be determined.

In addition, the opaque portions of the film according to the present invention can be provided on not only the above-mentioned transparent film, but also on other permeable films such as rabel paper constituted by sticking the parting agent and an adhesive paper.

Next, an image forming apparatus which can form an image on the above-mentioned recording sheet will be explained.

Figure 4:
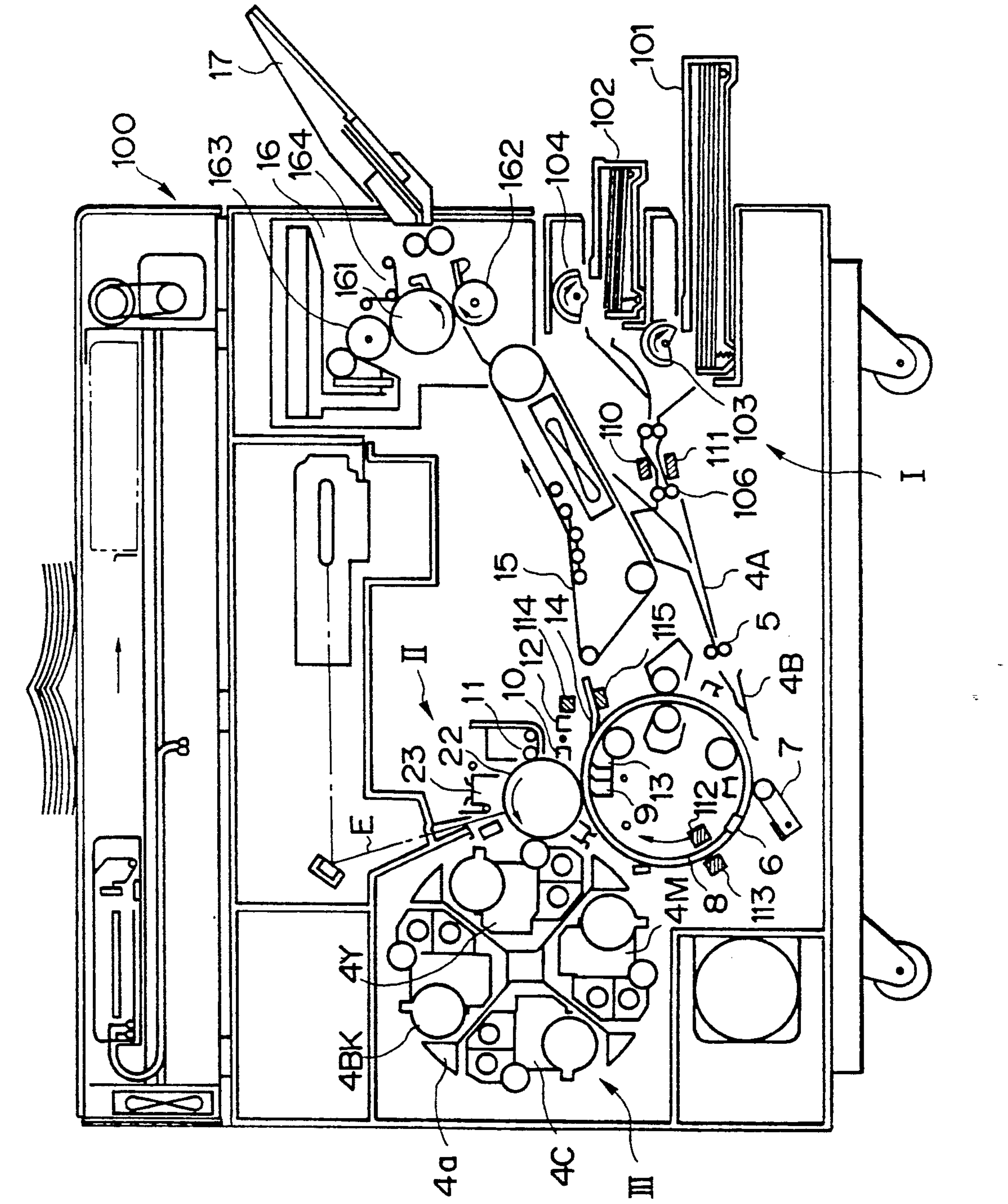
FIG. 4 is a schematic sectional view of an image forming apparatus according to the present invention.

FIG. 4 shows a schematic sectional view of an electronic photographic system as an image forming apparatus according to the present invention which can form a full-color image. In FIG. 4, the apparatus comprises a recording sheet feeding section I extending from a right (FIG. 4) of a body 100 of the apparatus to substantially a central portion of the body 100, a latent image forming section II arranged adjacent to a transfer drum 8 disposed in a central portion of the body 100 and constituting a part of the recording sheet feeding section I, and a developing section (rotatable developing device) III arranged adjacent to the latent image forming section II. The recording sheet feeding section I includes removable recording sheet supply trays 101, 102 which can be removably inserted into openings formed in the right (FIG. 4) portion of the body 100, sheet supply rollers 103, 104 disposed above the trays 101, 102, and sheet supply guides 4A, 4B including a sheet feed roller 106 and disposed in the vicinity of the sheet supply rollers 103, 104. Around the transfer drum 8 disposed in the vicinity of the sheet supply guide 4B, from an upstream side to a downstream side in the rotational direction of the drum, there are arranged, in order, an abutment roller 7, a gripper 6, a recording sheet separating discharger 12, and a separating claw 14. Further, in the interior of the drum 8, there are arranged a transfer charger 9 and a recording sheet separating discharger 13. In addition, there are arranged a conveying belt means 15 disposed adjacent to the separating claw 14, and a fixing device 16 disposed adjacent to a downstream end of the conveying belt means 15 and disposed in the vicinity of a removable ejector tray 17 extending out of the body 100 and removably mounted on the body 100.

The latent image forming section II includes an image bearing member (photosensitive drum) 22 rotatable in the direction shown by the arrow in FIG. 4 and abutted against the transfer drum 8; and a discharger 10, a cleaning means 11, a primary charger 23, an image forming means such as a laser beam scanner for forming an electrostatic latent image on a peripheral surface of the photosensitive drum 22, and an exposure portion comprising an image exposing reflection means such as a polygonal mirror. These latter elements are disposed around the photosensitive drum 22 from an upstream side to a downstream side in the rotational direction of the drum 22. The rotatable developing device III includes a rotatable frame (referred to as "rotary member" hereinafter) 4*a*, a yellow developing unit 4Y, a magenta developing unit 4M, a cyan developing unit 4C and a black developing unit 4BK. These units are mounted on the rotary member 4A and are constituted to visualize (develop) an electrostatic latent image formed on the peripheral surface of the photosensitive drum 22.

Next, an operation sequence of the whole image forming apparatus constituted as mentioned above will be explained. When the photosensitive drum 22 is rotated in the direction shown by the arrow in FIG. 4, the photosensitive member on the drum 22 is uniformly charged by the primary charger 23. When the photosensitive member is uniformly charged by the primary charger 23, an image exposure is effected by a laser beam E modulated by an yellow image signal from an original (not shown) to form the electrostatic latent image on the photosensitive drum 22, and then, the electrostatic latent image is developed by the yellow developing unit 4Y previously positioned in the developing position through the rotation of the rotary member 4A.

On the other hand, the recording sheet according to the present invention is fed from the supply tray 101 or 102 by means of the supply roller 103 or 104 toward the sheet feed roller 106. In the sheet feeding path, an optical sensor as an optical detecting means according to the invention is arranged. In the illustrated example, the optical detecting means comprises a permeable-type optical sensor including an LED light source (luminous element) 110 having a luminous wave length of 980 nm, and a light receiving element 111 such as a photo-transistor. The recording sheet is passed between the light source 110 and the light receiving element 111. The presence or absence of the recording sheet is determined by the fact whether the recording sheet interrupts the light from the light source 110 when a predetermined time period is elapsed after the recording sheet has been fed to the apparatus. If it is judged that the recording sheet interrupts the light from the light source and is normally fed, the recording sheet is fed through the feed roller 106 and supply guides 4A, 4B and is held by the gripper 6 of the transfer drum 8 at a predetermined timing, and then is electrostatically wrapped around the transfer drum 8 by the abutment roller 7 and an electrode opposing to the abutment roller 7. On the other hand, if the recording sheet does not interrupt the light from the light source after the predetermined time period, it is judged that the recording sheet is jammed. and the feed roller 106 is then stopped after a predetermined time period, and the operation of the apparatus is automatically stopped.

Further, an optical sensor comprising a light source 113 and a light receiving element 112 is provided for determining whether the wrapped recording sheet is properly positioned on the transfer drum 8 or not. If it is judged that the recording sheet is properly positioned, the transfer drum 8 will continue to rotate.

The transfer drum 8 is rotated in the direction shown by the arrow in FIG. 4 in synchronous with the rotation of the photosensitive drum 22, and the visualized image developed by the yellow developing unit 4Y is transferred onto the recording sheet by the transfer charger 9 at a position where the peripheral surface of the photosensitive drum 22 is abutted against the peripheral surface of the transfer drum 8. The transfer drum 8 continues to rotate for preparing the transfer of the next color image (in FIG. 4, magenta image).

On the other hand, the photosensitive drum 22 is discharged by the discharger (discharging charger) 10 and is cleaned by the cleaning means 11. Thereafter, the photosensitive drum 22 is charged again by the primary charger 23 and the image exposure is effected by a next magenta image signal. The rotatable developing device is rotated while the electrostatic latent image is being formed on the photosensitive drum 22 by the image exposure on the basis of the magenta image signal, thereby positioning the magenta developing unit 4M at a predetermined developing position to perform a predetermined magenta developing. Subsequently, the similar processes are performed with respect to the cyan color and the black color. When the four color images have been transferred onto the recording sheet, the multi-color image formed on the recording sheet is discharged by the dischargers 12 and 13, and then the recording sheet is released from the gripper 6 and is separated from the transfer drum 8 by the separating claw 14. Also in this case, by an optical sensor comprising a light source 115 and a light receiving element 114 similar to the aforementioned ones, it is determined whether the recording sheet is properly separated from the transfer drum. If the recording sheet is properly separated from the transfer drum, the recording sheet is conveyed by means of the conveying belt 15 to the fixing device 16, where the transferred image is fixed onto the recording sheet by heat and pressure, thus finishing the successive full-color printing sequence. In this way, a desired full-color image is formed on the recording sheet.

Incidentally, the fixing device 16 comprises a heat fixing roller 161, a pressure roller 162 and an application means 163 for supplying silicone oil to the heat fixing roller 161. The heat fixing roller 161 preferably includes a surface layer such as a silicone rubber layer having a good surface lublication feature. Further, preferably, a surface layer of the pressure roller 162 is constituted by fluororesin.

Next, the optical sensor 31 arranged in the image forming apparatus according to the present invention will be explained with reference to FIG. 3. The arrow 33 shown in FIG. 3 indicates a direction to which recording sheets P having three different sizes are fed in the apparatus. The reference numeral 32 denotes a center line of the sheet feeding path regarding the available maximum recording sheet.

Figure 3C:
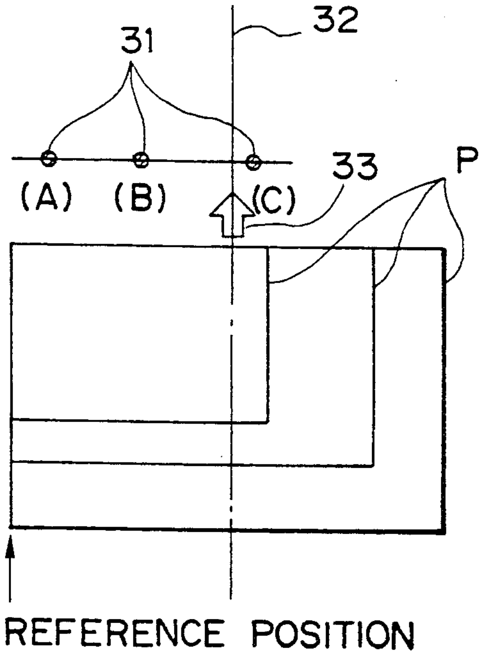

Three optical sensors 31(A), 31(B) and 31(C) shown in FIGS. 3A to 3C are provided for detecting the jamming of the recording sheet in the image forming apparatus. and at least one of these optical sensors is used for detecting front and back surfaces of the recording sheet.

FIG. 3A shows an example that the recording sheet is fed in accordance with a reference position disposed at one side of the sheet. The three optical sensors 31 are arranged asymmetrically with respect to the center lines of the recording sheets P of three different sizes. In this case, any of three optical sensors can be used for detecting the front and back surfaces of the sheet; however, since it is preferable to detect the front and back surfaces of the recording sheet as fast as possible before the image forming operation is initiated, the optical sensor corresponding to the position of the optical sensors 110, 111 shown in FIG. 4 (for example, optical sensor 31(B) in FIG. 3A) is preferably used for detecting the front and back surfaces of the sheet.

Further, explaining the position of the optical sensor for detecting the front and back surfaces of the sheet, since the OHP sheet now used has a regular size, when this optical sensor is positioned asymmetrically with respect to longitudinal and transverse center lines of the regular size sheet, even if the sensor is arranged symmetrically with respect to center lines of other size sheet, there is no problem in practical use.

FIG. 3C also shows an example that the recording sheet is fed in accordance with a reference position disposed at one side of the sheet. In this case, only the optical sensor 31(B) has no optical sensor positioned symmetrically with respect to the center line of the recording sheet. Further, in this case, it is preferable to detect the front and back surfaces of the recording sheet by the optical sensor 31(B). and it is naturally impossible to detect the front and back surfaces of the sheet by means of both optical sensors 31(A), 31(C) positioned symmetrically with respect to the center line of the recording sheet.

FIG. 3B shows an example that the recording sheet is fed in accordance with a reference position disposed on the center line. In this case, the optical sensors 31 have no optical sensors arranged symmetrically with respect to the center line of the recording sheet. Further, also in this case, similar to the case of FIG. 3A, any of the optical sensors 31(A), 31(B), 31(C) can be used for detecting the front and back surfaces of the recording sheet. Incidentally, in case of the central reference position, since the center line of the sheet is always positioned on the same line regardless of the sizes of the sheets, the optical sensors may be arranged on the basis of the central reference line 32 regardless of the size of the OHP sheet.

The optical sensors 31 shown in FIG. 3 may be reflection-type optical sensors wherein the light from the light source is reflected by the recording sheet to be directed to the light receiving element, or permeable-type optical sensors wherein the light from the light source is interrupted by the recording sheet not to enter the light receiving element, or both. Further, when a plurality of optical sensors are provided in the image forming apparatus, all of the optical sensors are not necessary the same type; but the combination of the above two types may be used. The light source which can be used in the optical sensor is a small-sized light source such as an LED, semi-conductor laser, fuse lamp or the like, and, in particular, the LED is preferable in view of the cheapness and compactness. Further, the light receiving element may be ones having photoelectric converting function such as a photo-diode, phototransistor or the like.

As mentioned above, while the present invention was explained in connection with the preferred embodiments, it should be understood that any modifications can be effected within the spirit and scope of the present invention.

What is claimed is:

1. A recording sheet used with an image forming apparatus, comprising:

an optical functional portion disposed along at least one edge of the recording sheet and arranged asymmetrically with respect to a center of said edge and having a functional feature regarding light different from that of an image forming portion of the recording sheet, wherein a front surface of the recording sheet has a feature different from that of a back surface of the recording sheet and said optical functional portion is detected in order to determine the front and back surfaces of the recording sheet.

2. A recording sheet according to claim 1, wherein said front surface of the recording sheet is coated by resin.

3. A recording sheet according to claim 1, wherein said recording sheet comprises a rectangular sheet.

4. A recording sheet according to claim 1, wherein said recording sheet comprises a transparent sheet, and said optical functional portion comprises an opaque portion.

5. A recording sheet according to claim 4, wherein said opaque portion cuts the light from a detecting light source by 60% or more.

6. A recording sheet according to claim 4, wherein said opaque portion reflects the light from a detecting light source by 60% or more.

7. A recording sheet according to claim 1, wherein said recording sheet comprises an OHP film.

8. A recording sheet used with an image forming apparatus, comprising:

an optical functional portion disposed along at least one edge of the recording sheet and arranged asymmetrically with respect to a center of said edge and having a functional feature regarding light different from that of an image forming portion of the recording sheet, wherein said optical functional portions are disposed along two edges of the recording sheet and said two edges along which said optical functional portions are disposed are perpendicular to each other.

* * * * *

UNITED STATES PATENT AND TRADEMARK OFFICE
CERTIFICATE OF CORRECTION

PATENT NO. : 5,126,762

DATED : June 30, 1992

INVENTOR(S) : TATSUO TAKEUCHI, ET AL.

It is certified that error appears in the above-identified patent and that said Letters Patent is hereby corrected as shown below:

COLUMN 1

Line 54, "deposing" should read --depositing--.

COLUMN 2

Line 41, "object" should read --objects--.

COLUMN 3

Line 19, "opaque 2" should read --opaque portions 2--.
Line 38, "are," should read --is,--.
Line 60, "corter" should read --coater--.

COLUMN 4

Line 24, "direction" should read --directions--.
Line 40, "coult not prevented" should read --could not be prevented--.

COLUMN 5

Line 60, "rotary mumber 4A" should read --rotary number 4a--.

COLUMN 6

Line 4, "an yellow" should read --a yellow--.
Line 10, "4A." should read --4a.--.
Line 48, "synchronous" should read --synchronism--.

--

UNITED STATES PATENT AND TRADEMARK OFFICE
CERTIFICATE OF CORRECTION

PATENT NO. : 5,126,762
DATED : June 30, 1992
INVENTOR(S) : TATSUO TAKEUCHI, ET AL.

It is certified that error appears in the above-identified patent and that said Letters Patent is hereby corrected as shown below:

COLUMN 7

Line 25, "lublication" should read --lubrication--.

COLUMN 8

Line 31, "necessary" should read --necessarily--.
Line 37, "element" should read --elements--.

Signed and Sealed this

Twelfth Day of October, 1993

Attest:

BRUCE LEHMAN

Attesting Officer

*Commissioner of Patents and Trademarks*

--